United States Patent
Nagano et al.

(10) Patent No.: US 6,980,443 B2
(45) Date of Patent: Dec. 27, 2005

(54) SWITCHING TYPE AC ADAPTER CIRCUIT WITH A LATCH PROTECTION CIRCUIT

(75) Inventors: Junji Nagano, Kitakyushu (JP); Kouji Murakami, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/789,502

(22) Filed: Feb. 26, 2004

(65) Prior Publication Data
US 2004/0208024 A1    Oct. 21, 2004

(30) Foreign Application Priority Data
Apr. 10, 2003    (JP) ............................. 2003-106346

(51) Int. Cl.$^7$ ............................................. H20M 3/335
(52) U.S. Cl. ............................... 363/21.12; 363/21.15; 363/56.1
(58) Field of Search ................. 363/21.12, 21.15, 363/21.16, 56.09, 21.18, 56.1, 56.11

(56) References Cited

U.S. PATENT DOCUMENTS

| | | | | |
|---|---|---|---|---|
| 4,428,015 A | * | 1/1984 | Nesler | 361/18 |
| 5,675,485 A | * | 10/1997 | Seong | 363/97 |
| 5,687,066 A | * | 11/1997 | Cook, II | 363/89 |
| 5,818,670 A | * | 10/1998 | Ahn | 363/56.1 |
| 5,835,361 A | * | 11/1998 | Fitzgerald | 363/56.1 |
| 6,005,789 A | * | 12/1999 | Lee | 363/21.13 |
| 6,088,244 A | * | 7/2000 | Shioya et al. | 363/21.07 |
| 6,094,362 A | * | 7/2000 | Domingo | 363/56.1 |

FOREIGN PATENT DOCUMENTS

JP    2000-156972 A    6/2000

* cited by examiner

*Primary Examiner*—Bao Q. Vu
(74) *Attorney, Agent, or Firm*—Frishauf, Holtz, Goodman & Chick, P.C.

(57) ABSTRACT

Disposed in a secondary side circuit and is connected to a constant voltage control circuit (22), to an overcurrent detection circuit (24), and to an overvoltage detection circuit (26), a photocoupler control circuit (28) controls a photocoupler (IC1) so as to feed a constant voltage detection control signal as a feedback signal back to a primary side circuit. The photocoupler control circuit (28) controls the photocoupler (IC1) so as to turn it off when the photocoupler control circuit is supplied with at least one of an overcurrent detected signal and an overvoltage detected signal. A voltage detection circuit (18) makes a latch circuit (16) operate when the voltage detection circuit detects a voltage induced in an auxiliary winding ($N_{SLD}$) of a transformer with the photocoupler turned off, thereby making a switching operation of a switching type AC adapter circuit stop.

3 Claims, 8 Drawing Sheets

PRIOR ART

SWITCHING TYPE AC ADAPTER CIRCUIT WITH A LATCH PROTECTION CIRCUIT

This application claims priority to prior Japanese application JP 2003-106346, the disclosure of which is incorporated herein by reference.

BACKGROUND OF THE INVENTION

This invention relates to a switching type AC adapter circuit and, in particular, to a switching type AC adapter circuit with a latch protection circuit.

A switching type AC adapter circuit of the type described comprises a primary side circuit for turning, by using a switching element, a DC voltage applied to a primary winding of a transformer on and off and a secondary side circuit for rectifying and smoothing a current induced in a secondary winding of the transformer to produce a secondary side output voltage.

In such a switching type AC adapter circuit, it is necessary to electrically isolate and separate the primary side circuit from the secondary side circuit in order to prevent an accident such as an electric shock. As means for electrically isolating and separating, a photocoupler or an isolation transformer is generally used. In the switching type AC adapter circuit, it is necessary to feed a variation of the secondary side output voltage as a constant voltage control signal back to the primary side circuit in order to carry out a constant voltage control. In this event, the constant voltage control signal is feed from the secondary side circuit back to the primary side circuit through a constant voltage controlling photocoupler.

The switching type AC adapter circuit may detect an overcurrent or an overvoltage in the secondary side circuit to feed an overcurrent detected signal or an overvoltage detected signal back to the primary side circuit. In this event, the primary side circuit comprises a latch circuit for making a switching operation of the switching type AC adapter circuit stop when the overcurrent or the overvoltage is detected in the secondary side circuit. In addition, the above-mentioned overcurrent detected signal of the above-mentioned overvoltage detected signal is transferred or fed from the secondary side circuit back to the latch circuit of the primary side circuit through a latching photocoupler.

In the manner which will later be described in conjunction with FIGS. 1–3, a conventional switching AC adapter circuit comprises not only a constant voltage controlling photocoupler but also a latching photocoupler. Accordingly, it is desired that one photocoupler used for a normal control (e.g. a constant voltage control or the like) transmits also an abnormal state (e.g. overvoltage, overcurrent, or the like).

In connection with this, Japanese Patent Publication No. 2000-156,972 or JP-A 2000-156972 discloses a switching power supply apparatus for overlapping, by using one switch, an overvoltage protection signal (or a remote control signal) to a constant voltage detection control signal for a main output voltage induced in a secondary side circuit to transmit an overlapped signal to a primary side circuit by isolating the primary side circuit with the secondary side circuit using one photocoupler.

However, the switching power supply apparatus disclosed in JP-A 2000-156972 is disadvantageous in that a primary control circuit disposed in the primary side circuit is complicated in structure and a different auxiliary power supply portion is required.

SUMMARY OF THE INVENTION

It is therefore an object of the present invention to provide a switching type AC adapter circuit which is simple in structure.

Other objects of this invention will become clear as the description proceeds.

On describing the gist of an aspect of this invention, it is possible to be understood that a switching type AC adapter circuit comprises a primary side circuit for turning, by using a switching element, an input DC voltage applied to a primary winding of a transformer on and off, a secondary side circuit for rectifying and smoothing an AC voltage induced in a secondary winding of the transformer to produce a secondary side output voltage, a constant voltage control circuit for detecting a variation of the secondary side output voltage to produce a constant voltage detection control signal, an overcurrent detection circuit for detecting an overcurrent in the secondary side circuit to produce an overcurrent detected signal, an overvoltage detection circuit for detecting an overvoltage in the secondary side circuit to produce an overvoltage detected signal, a photocoupler for feeding the constant voltage detection control signal as a feedback signal back to the primary side circuit, a switching control circuit for controlling, in response to the feedback signal, on and off of the switching element, and a latch circuit, disposed in the primary side circuit, for turning the switching element off when the overcurrent or the overvoltage is detected in the secondary side circuit.

According to the aspect of this invention, the above-mentioned switching type AC adapter circuit further comprises a photocoupler control circuit disposed in the secondary side circuit and a primary side detection circuit disposed in the primary side circuit. The photocoupler control circuit is connected to the constant voltage control circuit, to the overcurrent detection circuit, and to the overvoltage detection circuit. The photocoupler control circuit controls the photo coupler so as to feed the constant voltage detection control signal as the feedback signal back to the primary side circuit. The photocoupler control circuit controls the photocoupler so as to turn the photo coupler off when the photocoupler control circuit receives at least one of the overcurrent detected signal and the overvoltage detected signal. The primary side detection circuit makes the latch circuit operate when the primary side detection circuit detects that the photocoupler is turned off.

In the above-mentioned switching type AC adapter circuit, the constant voltage control circuit, the overcurrent detection circuit, the overvoltage detection circuit, and the photocoupler control circuit may preferably be implemented by one integrated circuit. The primary side detection circuit may comprise a voltage detection circuit for detecting a voltage induced in an auxiliary winding of the transformer when the photocoupler is turned off. The primary side detection circuit may comprise a current detection circuit for detecting that a collector current of a phototransistor in the photocoupler does not flow when the photo coupler is turned off. The primary side detection circuit may comprise a voltage detection circuit for detecting a voltage induced in an auxiliary winding of the transformer when the photocoupler is turned off and a current detection circuit for detecting that a collector current of a phototransistor in the photocoupler does not flow when the photocoupler is turned off.

DESCRIPTION OF THE PREFERRED EMBODIMENTS

Figure 1:
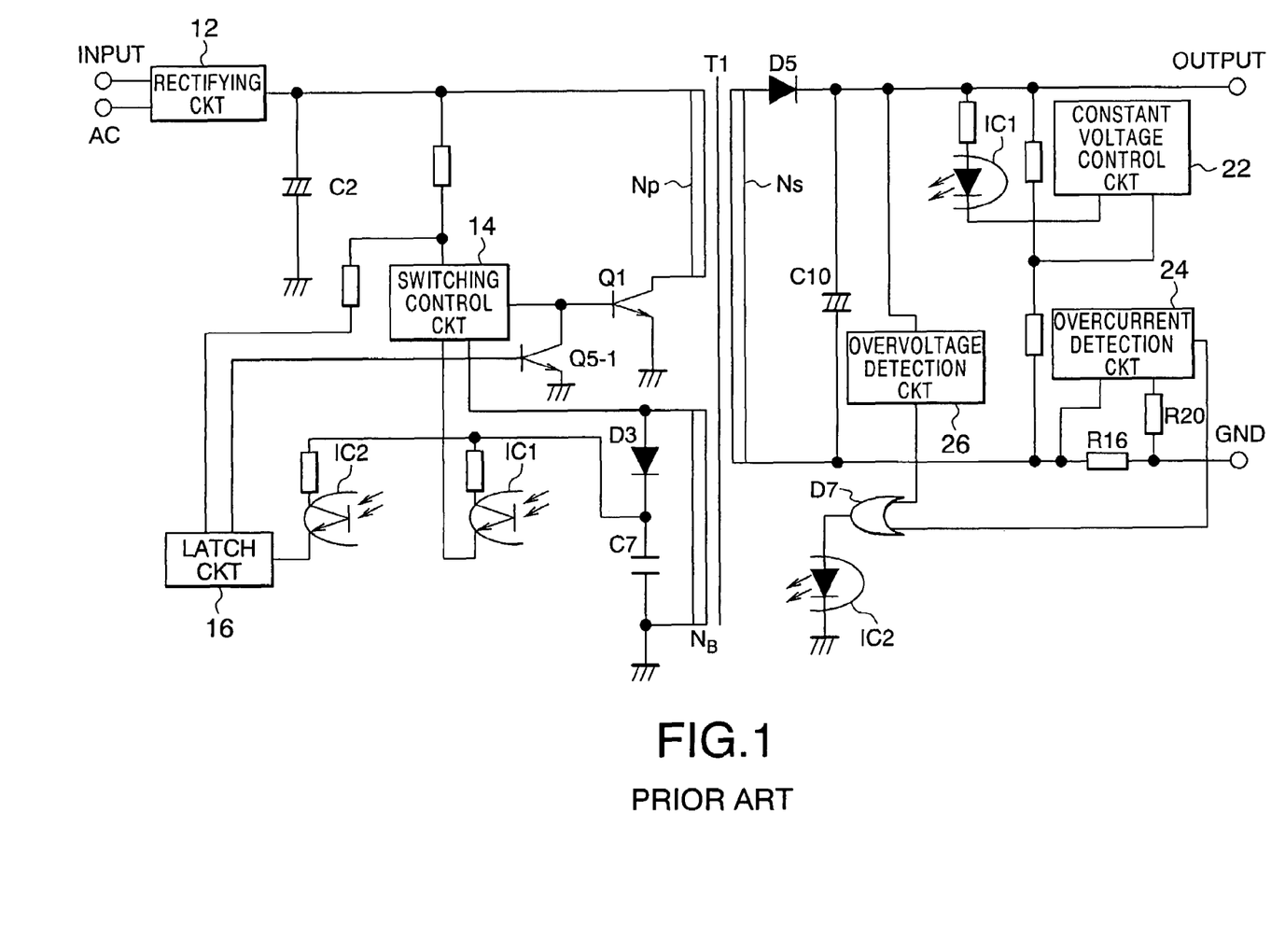
FIG. 1 is a block diagram of a conventional switching type AC adapter circuit.

Referring to FIG. 1, a conventional switching type AC adapter circuit will be described at first in order to facilitate an understanding of the present invention. The illustrated switching type AC adapter circuit includes, as a primary side circuit, a rectifying circuit 12, an input capacitor C2, a primary winding Np of a transformer T1, a switching control circuit 14, and a switching element Q1.

Supplied from an AC power supply, an input AC voltage is rectified by the rectifying circuit 12 and is smoothed by the input capacitor C2 to accumulate as an input DC voltage. The input DC voltage is applied to the primary winding Np of the transformer T1 to turn the input DC voltage on and off by the switching element Q1. Turning on and off of the switching element Q1 is controlled by an on-off control signal supplied from the switching control circuit 14.

In addition, the illustrated switching AC adapter circuit includes, as a secondary side circuit, a secondary winding Ns of the transformer T1, a diode D5, and an output capacitor C10. Induced in the secondary winding Ns of the transformer T1, an AC voltage is rectified by the diode D5 and is smoothed by the output capacitor C10 to produce a secondary side output voltage.

The secondary side circuit comprises a constant voltage control circuit 22, an overcurent detection circuit 24, and an overvoltage detection circuit 26. The constant voltage control circuit 22 detects a variation of the secondary side output voltage to produce a constant voltage detection control signal. The constant voltage detection control signal is fed back to the switching control circuit 14 disposed in the primary side circuit as a first feedback signal through a control voltage controlling photocoupler IC1. The overcurrent detection circuit 24 detects an overcurrent in the secondary side circuit to produce an overcurrent detected signal. The overvoltage detection circuit 26 detects an overvoltage in the secondary side circuit to produce an overvoltage detected signal. The overcurrent detected signal and the overvoltage detected signal are ORed by an OR gate D7 composed of a diode and an ORed signal is fed back to a latch circuit 16 disposed in the primary side circuit as a second feedback signal through a latching photo coupler IC2.

Responsive to the second feedback signal, the latch circuit 16 turns a transistor Q5-1 on to turn the switch element Q1 off, and thereby stopping a switching operation of the switching type AC adapter circuit.

In an auxiliary winding $N_B$ of the transformer T1, an AC voltage is induced and the induced AC voltage is used as an operation power of the switching control circuit 14, a phototransistor of the constant voltage controlling photocoupler IC1, and a phototransistor of the latching photocoupler IC2.

Figure 2:
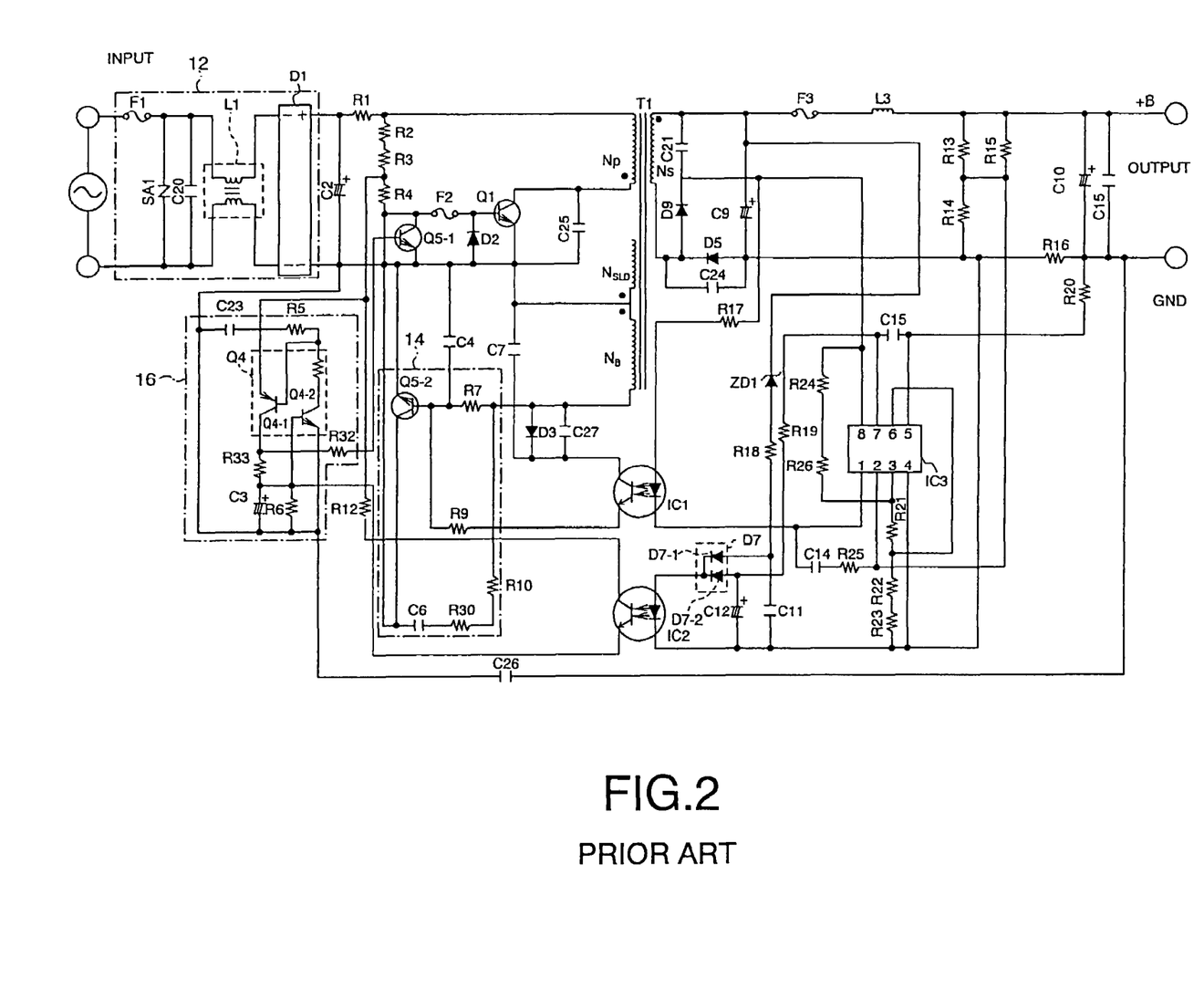
FIG. 2 is a circuit diagram showing a concrete circuit example of the conventional switching type AC adapter circuit illustrated in FIG. 1.

FIG. 2 shows a concrete circuit of the conventional switching type AC adapter circuit illustrated in FIG. 1. The rectifying circuit 12 comprises a fuse F1, a serge protection circuit SA1, a capacitor C20, a coil L1, and a diode bridge D1. The switching control circuit 14 comprises a transistor Q5-2, resistors R7, R9, R10, and R30, and a capacitor C6. The constant voltage control circuit 22 and the overcurrent detection circuit 24 are implemented by an integrated circuit IC3. In addition, the overvoltage detection circuit 26 of FIG. 1 comprises a Zener diode ZD1, a resistor R18, and a capacitor C11.

Figure 3:
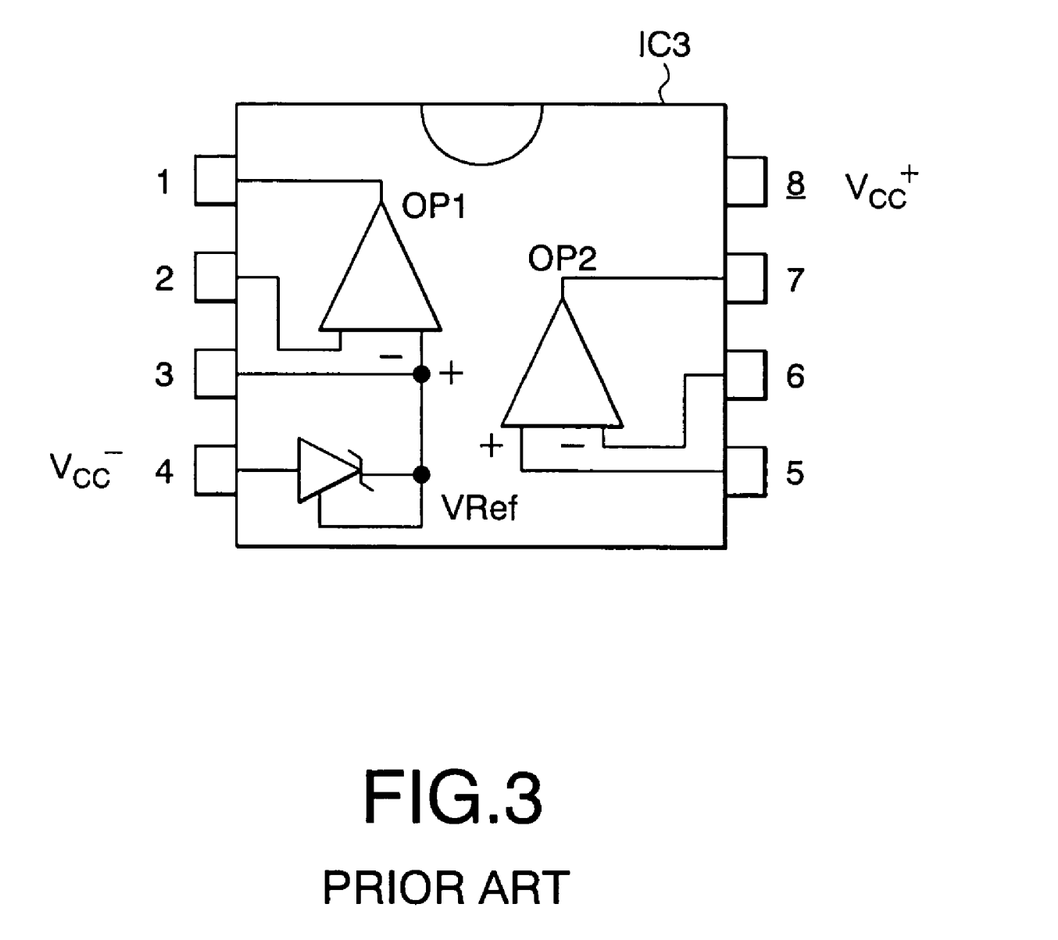
FIG. 3 is a block diagram showing an integrated circuit for use in the conventional switching type AC adapter circuit illustrated in FIG. 2.

FIG. 3 shows structure of the integrated circuit IC3. The integrated circuit IC3 has eight terminals affixed with symbols of 1 to 8. The terminal 1 is a first output terminal. The terminal 2 is a first inverting input terminal. The terminal 3 is a first non-inverting input terminal. The terminal 4 is a negative power supply terminal to which a negative power supply voltage Vcc− is inputted. The terminal 5 is a second non-inverting input terminal. The terminal 6 is a second inverting input terminal. The terminal 7 is a second output terminal. The terminal 8 is a positive power supply input terminal to which a positive power supply voltage Vcc+ is inputted.

The integrated circuit IC3 comprises a first operational amplifier OP1, a second operational amplifier OP2, and a shunt regulator for generating a reference voltage VRef. The first operational amplifier OP1 serves as the constant voltage control circuit 22 of FIG. 1. The second operational amplifier OP2 serves as the overcurrent detection circuit 24 of FIG. 1.

As shown in FIG. 2, the first output terminal 1 of the integrated circuit IC3 is connected to a cathode terminal of a photodiode of the constant voltage controlling photocoupler IC1. The first inverting input terminal 2 of the integrated circuit IC3 is connected to a dividing terminal of a potential divider circuit for dividing the secondary side output voltage that comprises resistors R13, R14, and R15. The negative power supply input terminal 4 of the integrated circuit IC3 is connected to a ground terminal GND of the secondary side circuit. The second output terminal 7 of the integrated circuit IC3 is connected to an anode of a photodiode of the latching photo coupler IC2 through a resistor R19 and a diode D7-2 of the OR circuit 7.

The latch circuit 16 of FIG. 1 comprises resistors R5, R6, R32, and R33, capacitors C3 and C23, and a transistor circuit Q4 consisting of transistors Q4-1 and Q4-2.

In FIG. 2, black circles ● affixed with the primary winding Np, the secondary winding Ns, the auxiliary winding $N_B$, and a second auxiliary winding $N_{SLD}$ indicate a starting portion of the winding.

With this structure, description will be made as regards operation of the switching type AC adapter circuit in a case where the overcurrent or the overvoltage is detected in the secondary side circuit.

It will be assumed that the secondary side circuit is put into an overvoltage state. In this event, a plus terminal + of the capacitor C9 has a high potential. Therefore, a current flows to a capacitor C11 through a diode D6 and a resistor R18 and electric charges are accumulated in the capacitor C11. As a result, the current flows in a photodiode of the latching photocoupler IC2 through a diode D7-1 of the OR circuit D7.

It will be assumed that the secondary side circuit is put into an overcurrent state. In this event, inasmuch as an overcurrent flows in an resistor R16, the second non-inverting input terminal 5 of the integrated circuit IC3 has a potential higher than that of the second inverting input terminal thereof and then the second operational amplifier OP2 has an output of a high level. Accordingly, a current flows in a capacitor C12 through a resistor R19 and electric charges are accumulated in the capacitor C12. As a result, the current flows through the diode D7-2 of the OR circuit D7 in the photodiode of the latching photo coupler IC2.

When the current flows in the photodiode of the latching photocoupler IC2, the photodiode emits light and then emitted light is received by a phototransistor of the latching photocoupler IC2. As a result, a collector current flows from the phototransistor and then in a capacitor C3 of the latch circuit 16, and electric charges are accumulated in the capacitor C3. As a result, a plus terminal + of the capacitor C3 has a high potential. Therefore, a transistor Q4-2 is turned on and a transistor Q4-1 is turned on. When the transistor Q4-1 is turned on, a current flows in the capacitor C3 and a voltage of the plus terminal of the capacitor C3 is held or latched.

When the latch circuit 16 is latched, a current flows to a base of a transistor Q5-1 through a resistor R32 and the transistor Q5-1 is turned on. As a result, the switching element Q1 is turned off and the switching operation of the switching type AC adapter circuit stops.

In order to release latch from the latch circuit 16, it is necessary to turn the AC power supply off once and to turn the AC power supply on again.

In the manner which is described above, the conventional switching type AC adapter circuit comprises not only the constant voltage controlling photocoupler IC1 but also the latching photocoupler IC2. Accordingly, it is desired that one photocoupler IC1 used for a normal control (e.g. the constant voltage control or the like) transmits also an abnormal state (e.g. the overvoltage, the overcurrent, or the like).

In connection with this, JP-A 2000-156972 discloses a switching power supply apparatus for overlapping, by using one switch, an overvoltage protection signal (or a remote control signal) to a constant voltage detection control signal for a main output voltage induced in a secondary side circuit to transmit an overlapped signal to a primary side circuit by isolating the primary side circuit with the secondary side circuit using one photocoupler.

However, the switching power supply apparatus is disadvantageous in that a primary control circuit disposed in the first side circuit is complicated in structure and a different auxiliary power supply portion is required, as mentioned in the preamble of the instant specification.

Figure 4:
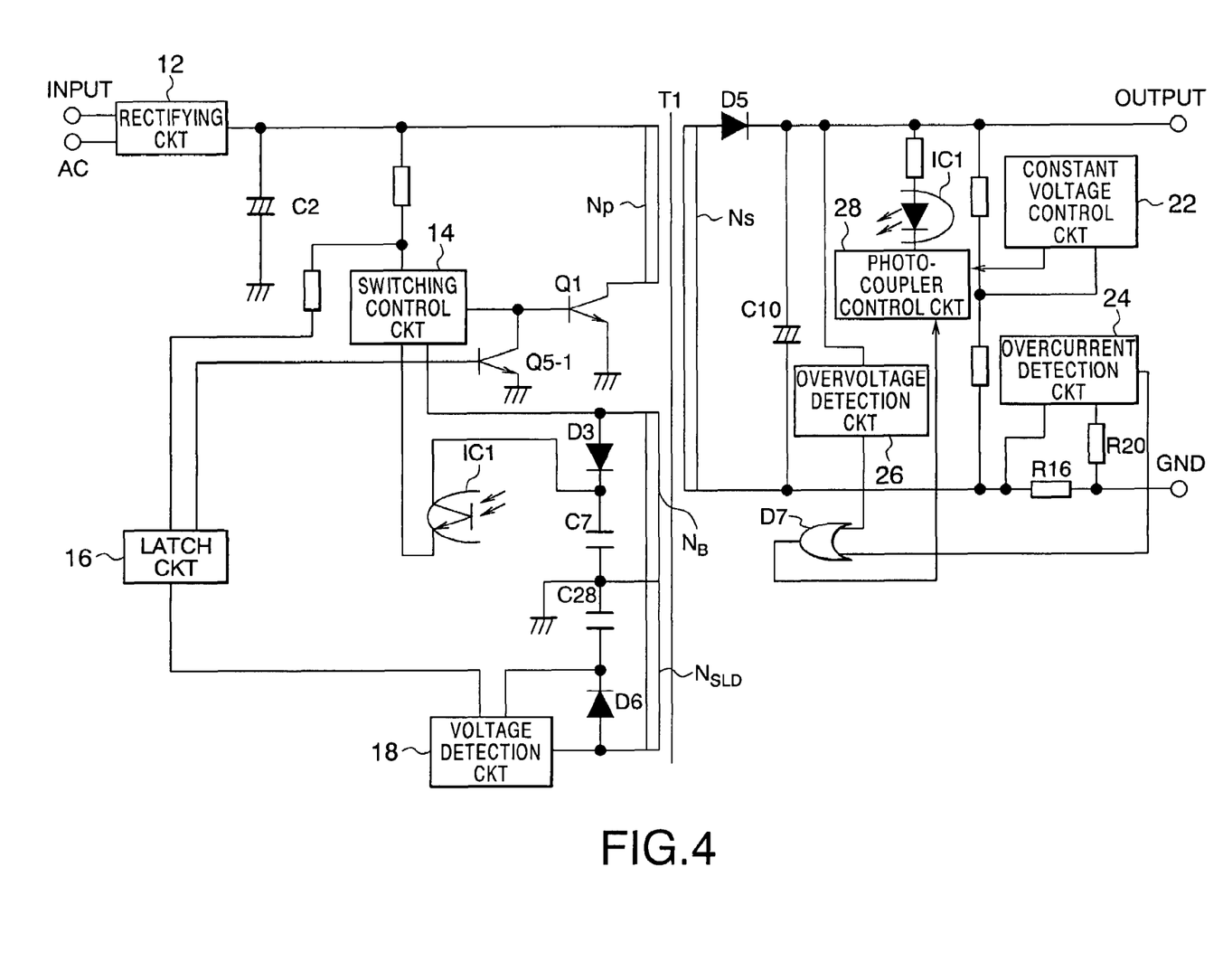
FIG. 4 is a block diagram of a switching type AC adapter circuit according to a first embodiment of this invention.

Referring to FIG. 4, the description will proceed to a switching type AC adapter circuit according to a first embodiment of this invention. The illustrated switching type AC adapter circuit is similar in structure and operation to the conventional switching type AC adapter illustrated in FIG. 1 except that the latching photocoupler IC2 is removed, the secondary side circuit further comprises a photocoupler control circuit 28, and the primary side circuit further comprises a voltage detection circuit 18 connected to the second auxiliary winding $N_{SLD}$ of the transformer T1. Accordingly, similar reference symbols are attached to those having functions similar to components illustrated in FIG. 1 and description thereto is omitted in order to simplify the description.

In this invention, one photo coupler IC1 is used as a constant voltage controlling and latching photocoupler.

The photocoupler control circuit 28 is supplied with the constant voltage detection control signal from the constant voltage control circuit 22, with the overcurrent detected signal from the overcurrent detection circuit 24, and with the overvoltage detected signal from the overvoltage detection circuit 26.

The photocoupler control circuit 28 operates in the manner which will presently described. It will be assumed that the switching type AC adapter circuit is put into a normal control state where any abnormal is not detected so that the photocoupler control circuit 28 is not supplied with any of the overcurrent detected signal and the overvoltage detected signal. In this event, responsive to the constant voltage detection control signal, the photocoupler control circuit 28 sets its control terminal in an intermediate potential between a power supply voltage Vcc and a ground potential GND and operates linearly. That is, the photocoupler control circuit 28 controls the photocoupler IC1 so as to feed the constant voltage detection control signal as the first feedback signal back to the primary side circuit.

On the other hand, it will be assumed that an abnormal is detected because the photocoupler control circuit 28 is supplied with any of the overcurrent detected signal and the overvoltage detected signal. In this event, the photocoupler control circuit 28 controls its control terminal so as to make it a logic high level (Vcc).

Now, the description will be made as regards operation in a case where the control terminal of the photocoupler control circuit 28 is put into the logic high level. In this event, the photodiode of the photocoupler IC1 does not emit light because there is no potential difference between its anode terminal and its cathode terminal. Simultaneously, the collector current of the phototransistor of the photocoupler IC1 does not flow. As a result, a voltage induced in the second auxiliary winding $N_{SLD}$ of the transformer T1 disposed in the first primary side circuit increases. The increased voltage is detected by the voltage detection circuit 18 and the voltage detection circuit 18 makes the latch circuit 16 operate. Accordingly, it is possible to stop the switching operation of the switching type AC adapter circuit.

Figure 5:
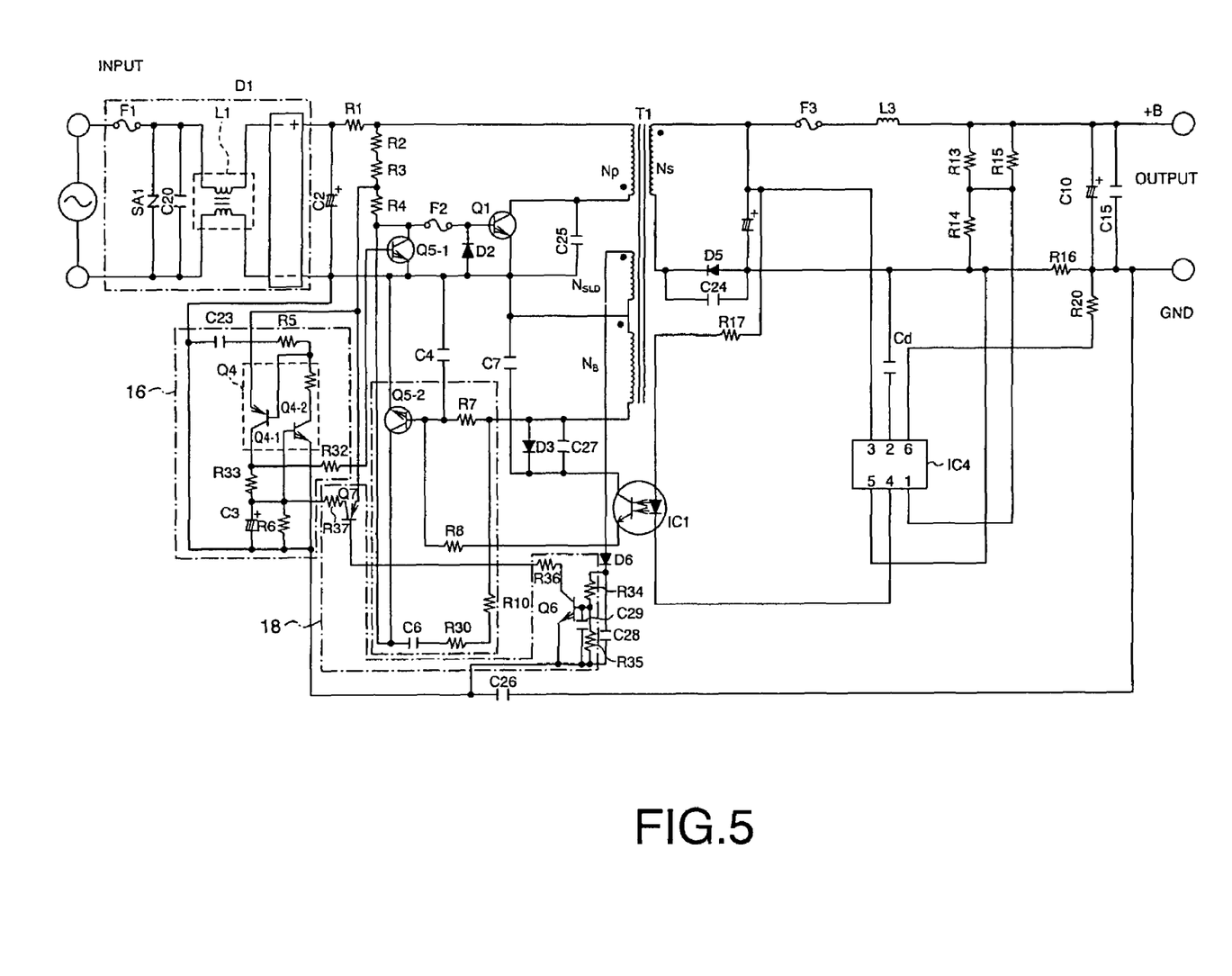
FIG. 5 is a circuit diagram showing a concrete circuit example of the switching type AC adapter circuit illustrated in FIG. 4.

FIG. 5 shows a concrete circuit example of the switching type AC adapter circuit illustrated in FIG. 4. Similar reference symbols are attached to those having functions similar to components illustrated in FIG. 2 and description thereof is omitted in order to simplify the description.

The constant voltage control circuit 22, the overcurrent detection circuit 24, the overvoltage detection circuit 26, and the photocoupler control circuit 28 are implemented by an integrated circuit IC4. The voltage detection circuit 18 comprises resistors R34, R35, R36, and R37, a capacitor C29, and transistors Q6 and Q7.

Figure 6:
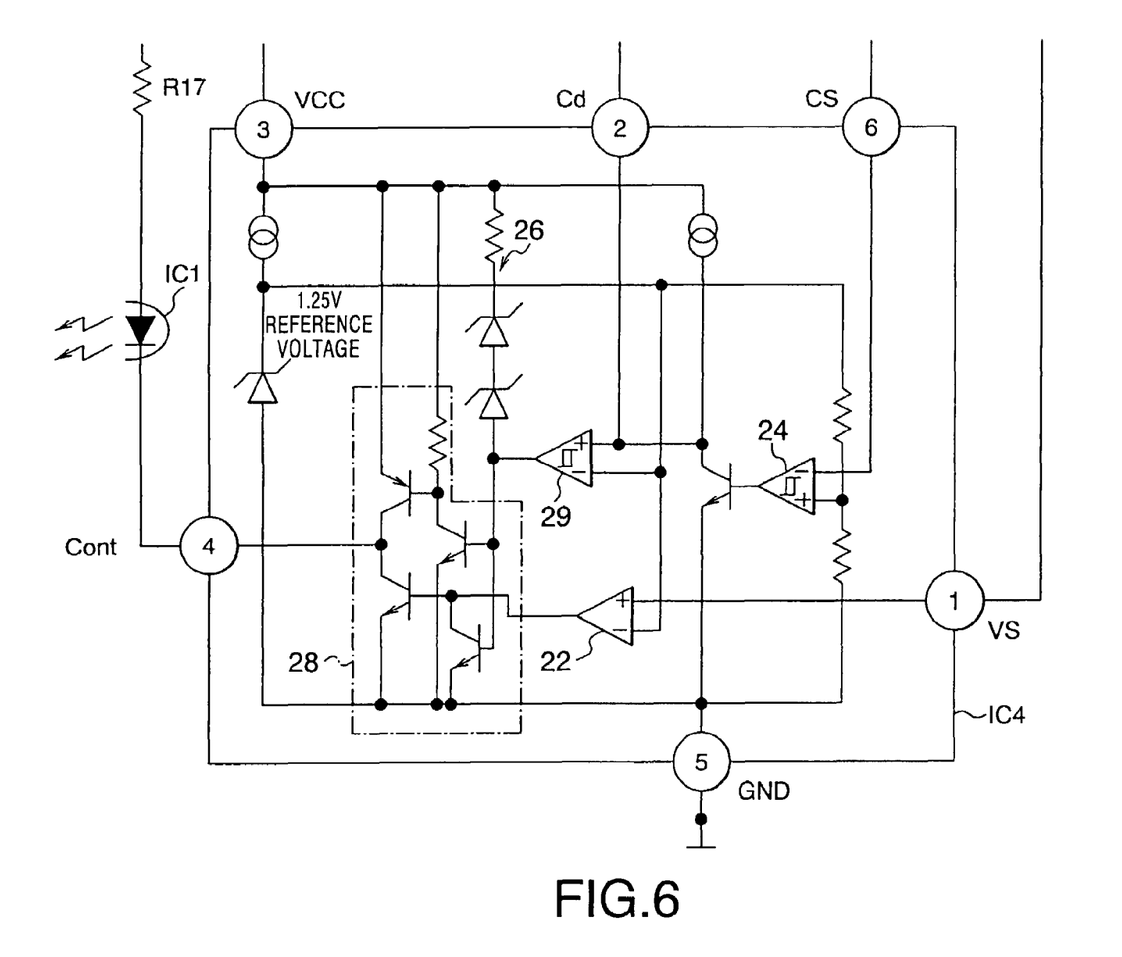
FIG. 6 is a block diagram showing an integrated circuit for use in the switching type AC adapter circuit illustrated in FIG. 5.

FIG. 6 shows structure of the integrated circuit IC4. The integrated circuit IC4 has six terminals affixed with symbols of 1 to 6. The terminal 1 is a constant voltage detection input terminal VS. The terminal 2 is an overcurrent delay time setting input terminal Cd. The terminal 3 is a power supply input terminal VCC to which the power supply voltage is supplied. The terminal 4 is a control terminal Cont. The terminal 5 is a ground terminal GND. The terminal 6 is an overcurrent detection input terminal CS.

Referring to FIG. 5 in addition to FIG. 6, the constant voltage detection input terminal 1 (VS) of the integrated circuit IC4 is connected to a potential dividing terminal of the constant voltage detection resistors R13, R14, and R15. The overcurrent delay time setting input terminal 2 (Cd) of the integrated circuit IC4 is connected to a common terminal of the secondary side circuit through an overcurrent delay time setting capacitor Cd. The power supply input terminal 3 (VCC) of the integrated circuit IC4 is connected to a positive electrode terminal of the secondary winding Ns of the transformer T1. The control terminal 4 (Cont) of the integrated circuit IC4 is connected to a cathode terminal of the photodiode of the photocoupler IC1. The ground terminal 5 (GND) of the integrated circuit IC4 is connected to a common terminal (the ground terminal) GND of the secondary side circuit. The overcurrent detection input terminal 6 (CS) of the integrated circuit IC4 is connected to one end of the overcurrent detection resistor R16 through the resistor R20.

As shown in FIG. 6, the integrated circuit IC4 comprises the constant voltage control circuit 22, the overcurrent detection circuit 24, the overvoltage detection circuit 26, the photocoupler control circuit 28, and a delay circuit 29.

Referring now to FIG. 5, the description will be made as regards operation in a case where an overcurrent or an overvoltage is detected in the secondary side circuit.

It will be assumed that the secondary side circuit is put into an overvoltage state or an overcurrent state. The integrated circuit IC4 makes the control terminal 4 the logic high level. The photodiode of the photocoupler IC1 does not emit light because there is no potential difference between its anode terminal and its cathode terminal. Simultaneously, the phototransistor of the photo coupler IC1 flows no collector current. As a result, a voltage induced in the second auxiliary winding $N_{SLD}$ of the transformer T1 disposed in the primary side circuit increases.

The increased voltage is rectified by the diode D6 and thereafter is smoothed by the capacitor C28. As a result, a voltage of a capacitor C28 increases. When the voltage of the capacitor C28 increases, a transistor Q6 of the voltage detection circuit 18 is turned on. When the transistor Q6 is turned on, a transistor Q7 is turned on, its collector current flows in a capacitor C3 of the latch circuit 16, and electric charges are accumulated in the capacitor C3.

By making the latch circuit 16 operate in the manner which is described above, it is possible to stop the switching operation of the switching type AC adapter circuit.

Figure 7:
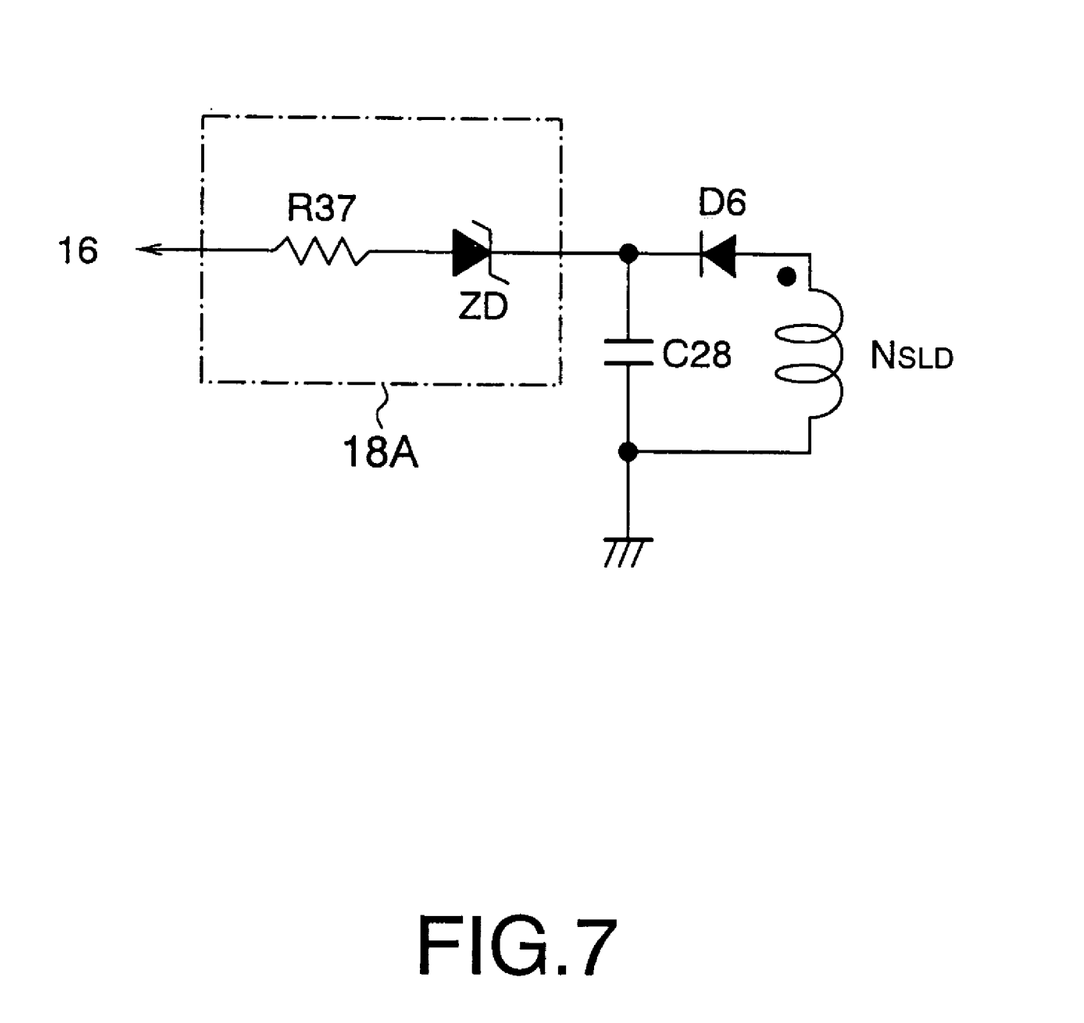
FIG. 7 is a circuit diagram of a voltage detection circuit in lieu of a voltage detection circuit for use in the switching type AC adapter circuit illustrated in FIG. 5.

Although the switching type AC adapter circuit illustrated in FIG. 5 uses, as the voltage detection circuit 18, a circuit including two transistors Q6 and Q7, a voltage detection circuit 18A using a Zener diode ZD may be used as illustrated in FIG. 7 in lieu of such a voltage detection circuit 18.

Figure 8:
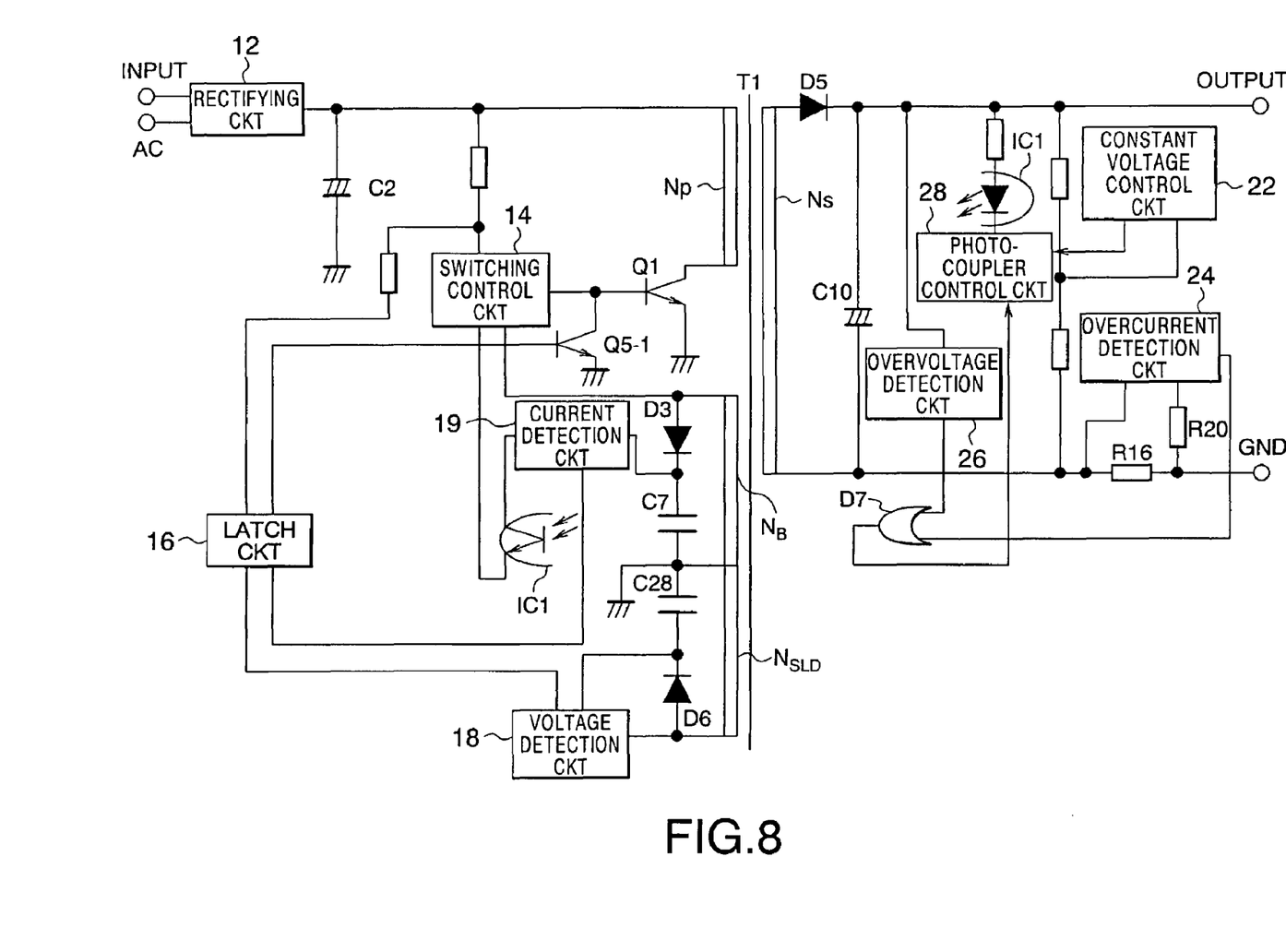
FIG. 8 is a block diagram of a switching type AC adapter circuit according to a second embodiment of this invention.

Referring to FIG. 8, the description will proceed to a switching type AC adapter circuit according to a second embodiment of this invention. The illustrated switching type AC adapter circuit is similar in structure and operation to the switching type AC adapter circuit illustrated in FIG. 4 except that the primary side circuit further comprises a current detection circuit 19. Accordingly, the same reference symbols are attached to those having similar functions in those illustrated in FIG. 4 and description thereto is omitted for the purpose of simplification of the description.

The current detection circuit 19 is a circuit for detecting the collector current of the phototransistor of the photocoupler IC1. When the collector current does not flow, the current detection circuit 19 makes the latch circuit 16 operate. As a result, it is possible to stop the switching operation of the switching type AC adapter circuit.

Although the switching type AC adapter circuit illustrated in FIG. 8 comprises two detection circuit, namely, the voltage detection circuit 18 and the current detection circuit 19 disposed in the primary side circuit, the switching type AC adapter circuit may comprises only the current detection circuit 19 disposed in the primary side circuit.

In the manner which is described above, in this invention, abnormality (the overvoltage, the overcurrent, and so on) detected in the secondary side circuit is transmitted to the primary side circuit by turning the photocoupler IC1 off. Accordingly, it is possible to simplify structure of the primary control circuit (the switching control circuit 14 and the latch circuit 16) disposed in the primary side circuit. In addition, although a transmission rout of the abnormal detection circuit in the secondary side circuit breaks because circuit abnormality occurs due to part abnormality, solder inferiority, or the like, the switching type AC adapter circuit operates in safety.

It will be assumed that there is no power supply for protection circuits (the constant voltage control circuit 22, the overcurrent detection circuit 24, the overvoltage detection circuit 26, and the photo coupler control circuit 28) because outputs of the secondary side circuit of the switching type AC adapter circuit short-circuits. In this event also, the switching type AC adapter circuit operates in safety because the photocoupler IC1 is turned off. That is, an auxiliary power supply for making the photo coupler control circuit 28 operate is unnecessary.

While this invention has thus far been described in conjunction with a few preferred embodiments thereof, it will now be readily possible for those skilled in the art to put this invention into various other manners.

What is claimed is:

1. A switching type AC adapter circuit comprising:
a primary side circuit for turning on and off, by using a switching element, an input DC voltage applied to a primary winding of a transformer;
a secondary side circuit for rectifying and smoothing an AC voltage induced in a secondary winding of said transformer to produce a secondary side output voltage;
a constant voltage control circuit for detecting a variation of said secondary side output voltage to produce a constant voltage detection control signal;
an overcurrent detection circuit for detecting an overcurrent in said secondary side circuit to produce an overcurrent detected signal;
an overvoltage detection circuit for detecting an overvoltage in said secondary side circuit to produce an overvoltage detected signal;
a photocoupler for feeding said constant voltage detection control signal as a feedback signal back to said primary side circuit;
a switching control circuit for controlling, in response to said feedback signal, on and off states of said switching element;
a latch circuit, disposed in said primary side circuit, for turning said switching element off when at least one of the overcurrent and the overvoltage is detected in said secondary side circuit;
a photocoupler control circuit which is disposed in said secondary side circuit and connected to said constant voltage control circuit, said overcurrent detection circuit, and said overvoltage detection circuit, and which controls said photocoupler so as to feed said constant voltage detection control signal as said feedback signal back to said primary side circuit, said photocoupler control circuit controlling said photocoupler so as to turn said photocoupler off when said photocoupler control circuit receives at least one of said overcurrent detected signal and said overvoltage detected signal; and a primary side detection circuit, disposed in said primary side circuit, for making said latch circuit operate when said primary side detection circuit detects that said photocoupler is turned off;

wherein said primary side detection circuit comprises a voltage detection circuit for detecting a voltage that is induced in an auxiliary winding of said transformer when said photocoupler is turned off.

2. A switching type AC adapter circuit as claimed in claim 1, wherein said constant voltage control circuit, said overcurrent detection circuit, said overvoltage detection circuit, and said photocoupler control circuit are implemented by one integrated circuit.

3. A switching type AC adapter circuit as claimed in claim 1, wherein said primary side detection circuit further comprises a current detection circuit for detecting that a collector current of a phototransistor in said photocoupler does not flow when said photocoupler is turned off.

* * * * *